(12) United States Patent
Okada et al.

(10) Patent No.: US 11,777,169 B2
(45) Date of Patent: Oct. 3, 2023

(54) METHOD OF MANUFACTURING POWER STORAGE MODULE

(71) Applicant: Prime Planet Energy & Solutions, Inc., Tokyo (JP)

(72) Inventors: Wataru Okada, Kobe (JP); Seiichi Sakuramoto, Kobe (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 47 days.

(21) Appl. No.: 17/672,599

(22) Filed: Feb. 15, 2022

(65) Prior Publication Data

US 2022/0263182 A1    Aug. 18, 2022

(30) Foreign Application Priority Data

Feb. 17, 2021 (JP) ................................. 2021-023191

(51) Int. Cl.
*H01M 50/26* (2021.01)
*H01M 10/04* (2006.01)
*H01M 50/264* (2021.01)

(52) U.S. Cl.
CPC ....... *H01M 50/26* (2021.01); *H01M 10/0404* (2013.01); *H01M 10/0481* (2013.01); *H01M 50/264* (2021.01)

(58) Field of Classification Search
CPC ...... H01M 50/20; H01M 50/26; H01M 50/30; H01M 10/04; H01M 10/0404; H01M 10/0481
See application file for complete search history.

(56) References Cited

U.S. PATENT DOCUMENTS

| | | | | |
|---|---|---|---|---|
| 2008/0090146 | A1* | 4/2008 | Batson | B23K 20/22 429/188 |
| 2012/0107669 | A1* | 5/2012 | Viavattine | H01M 10/0436 429/153 |
| 2013/0164578 | A1* | 6/2013 | Sweet | H01M 10/0481 429/82 |
| 2015/0132622 | A1* | 5/2015 | Gohl | H01M 50/569 429/90 |

FOREIGN PATENT DOCUMENTS

JP    2010272378 A    12/2010

* cited by examiner

*Primary Examiner* — Kenneth J Douyette
(74) *Attorney, Agent, or Firm* — HAUPTMAN HAM, LLP

(57) ABSTRACT

A method of manufacturing a power storage module includes: stacking a plurality of power storage cells along a first direction; compressing the plurality of power storage cells along the first direction; aligning the plurality of power storage cells in a second direction orthogonal to the first direction after relieving pressing force of the compressing; compressing the plurality of power storage cells along the first direction after aligning the plurality of power storage cells in the second direction; disposing a restraint portion on both sides in the first direction with respect to the plurality of power storage cells under application of pressing force of the compressing; and restraining the plurality of power storage cells by the restraint portion along the first direction by relieving, after disposing the restraint portion, the pressing force of the compressing.

6 Claims, 17 Drawing Sheets

METHOD OF MANUFACTURING POWER STORAGE MODULE

This nonprovisional application is based on Japanese Patent Application No. 2021-023191 filed on Feb. 17, 2021, with the Japan Patent Office, the entire contents of which are hereby incorporated by reference.

BACKGROUND OF THE INVENTION

Field of the Invention

The present technology relates to a method of manufacturing a power storage module.

Description of the Background Art

A battery module (power storage module) in which a plurality of battery cells (power storage cells) are stacked has been conventionally known. Such a structure is disclosed, for example, in Japanese Patent Laying-Open No. 2010-272378 or the like.

If the stack is pressed and restrained in the stacking direction in such a state that the plurality of stacked power storage cells are not sufficiently aligned, it may be difficult to correct the positions of the power storage cells to intended positions. In view of the above, the conventional structure is not necessarily sufficient.

SUMMARY OF THE INVENTION

An object of the present technology is to provide a method of manufacturing a power storage module to precisely align a plurality of stacked power storage cells.

A method of manufacturing a power storage module according to an embodiment of the present technology includes: stacking a plurality of power storage cells along a first direction; compressing the plurality of power storage cells along the first direction; aligning the plurality of power storage cells in a second direction orthogonal to the first direction after relieving pressing force of the compressing of the plurality of power storage cells along the first direction; compressing the plurality of power storage cells along the first direction after aligning the plurality of power storage cells in the second direction; disposing a restraint portion on both sides in the first direction with respect to the plurality of power storage cells under application of pressing force of the compressing of the plurality of power storage cells along the first direction after aligning the plurality of power storage cells in the second direction; and restraining the plurality of power storage cells by the restraint portion along the first direction by relieving, after disposing the restraint portion, the pressing force of the compressing of the plurality of power storage cells along the first direction after aligning the plurality of power storage cells in the second direction.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
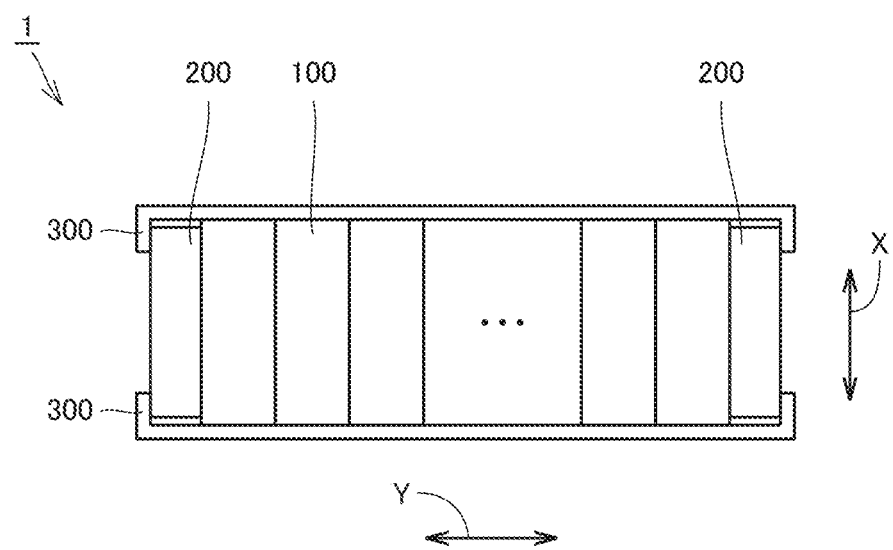
FIG. 1 is a diagram showing a basic configuration of a battery pack.

Hereinafter, embodiments of the present technology will be described. It should be noted that the same or corresponding portions are denoted by the same reference characters, and may not be described repeatedly.

It should be noted that in the embodiments described below, when reference is made to number, amount, and the like, the scope of the present technology is not necessarily limited to the number, amount, and the like unless otherwise stated particularly. Further, in the embodiments described below, each component is not necessarily essential to the present technology unless otherwise stated particularly.

It should be noted that in the present specification, the terms "comprise", "include", and "have" are open-end terms. That is, a certain configuration is included and inclusion of a configuration other than the foregoing configuration is not excluded.

Figure 2:
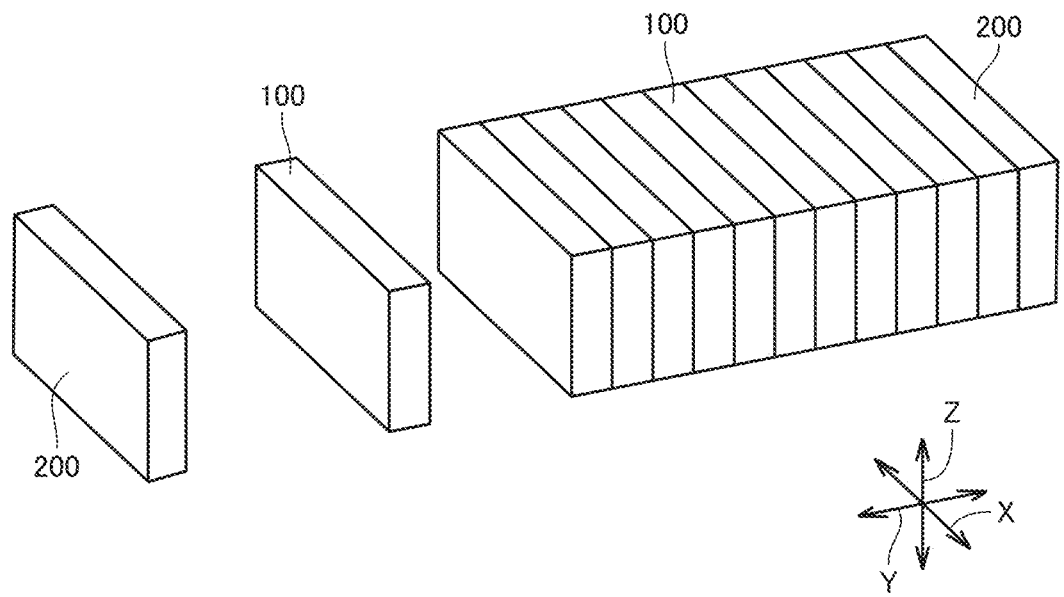
FIG. 2 is a diagram showing battery cells and end plates in the battery pack shown in FIG. 1.
Figure 3:
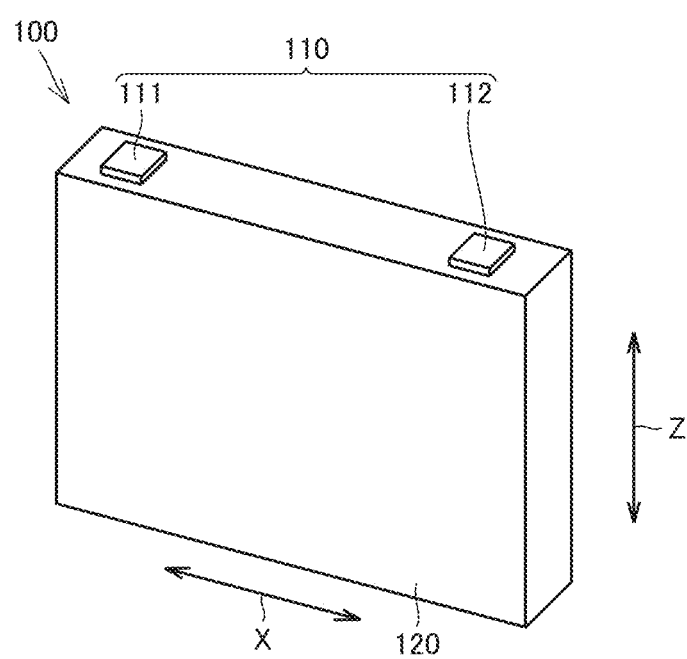
FIG. 3 is a diagram showing a battery cell in the battery pack shown in FIG. 1.

FIG. 1 is a diagram showing a basic configuration of a battery pack 1. FIG. 2 is a diagram showing battery cells 100 and end plates 200 included in battery pack 1. FIG. 3 is a diagram showing a battery cell 100 in battery pack 1.

As shown in FIGS. 1 and 2, battery pack 1, which serves as an exemplary "power storage module", includes battery cells 100, end plates 200, and a restraint member 300.

As an example, battery cell 100 is a lithium ion battery, but battery cell 100 may be another battery such as a nickel-hydrogen battery. Further, in the present disclosure, the "power storage module" is not limited to battery pack 1, and a capacitor may be used as the "power storage cell" instead of battery cell 100, for example.

The plurality of battery cells 100 are provided side by side in a Y axis direction (arrangement direction). Each of battery cells 100 includes an electrode terminal 110. A separator (not shown) is interposed between the plurality of battery cells 100. The plurality of battery cells 100, which are sandwiched between two end plates 200, are pressed by end plates 200, and are therefore restrained between two end plates 200.

End plates 200 are disposed beside both ends of battery pack 1 in the Y axis direction (arrangement direction). Each of end plates 200 is fixed to a base such as a case that accommodates battery pack 1.

Restraint member 300 connects two end plates 200 to each other. Restraint member 300 is attached to two end plates 200.

Restraint member 300 is engaged with end plates 200 with compression force in the Y axis direction being exerted to the stack of the plurality of battery cells 100 and end plates 200, and then the compression force is relieved, with the result that tensile force acts on restraint member 300 that connects two end plates 200 to each other. As a reaction thereto, restraint member 300 presses two end plates 200 in directions of bringing them closer to each other.

As shown in FIG. 3, battery cell 100 is formed to have a flat rectangular parallelepiped shape. Electrode terminal 110 includes a positive electrode terminal 111 and a negative electrode terminal 112. Electrode terminal 110 is formed on a housing 120 having a prismatic shape. An electrode assembly (not shown) and an electrolyte solution (not shown) are accommodated in housing 120.

Figure 4:
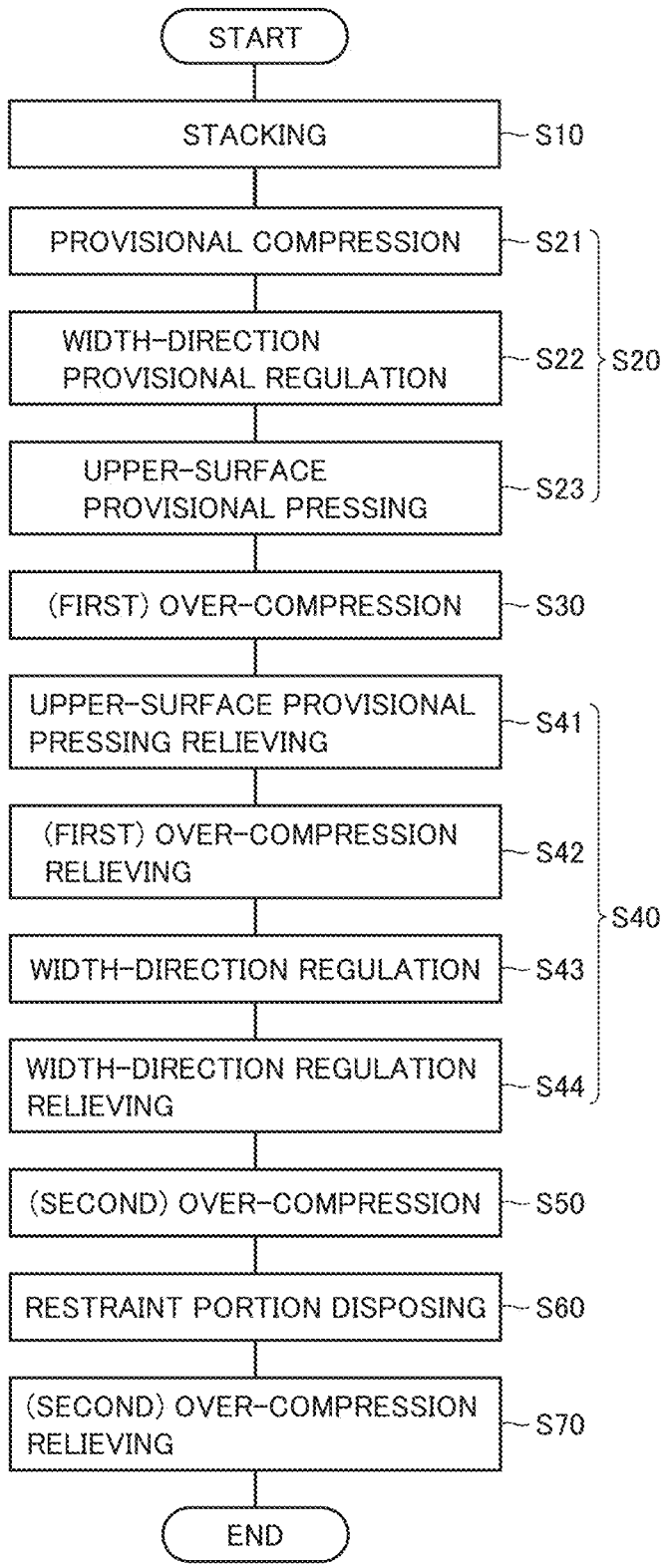
FIG. 4 is a flowchart showing steps of a method of manufacturing a power storage module.

FIG. 4 is a flowchart showing steps of a method of manufacturing battery pack 1 (power storage module). As shown in FIG. 4, the method of manufacturing battery pack 1 includes: a step (S10: stacking step) of stacking the plurality of battery cells 100 (power storage cells) along the Y axis direction (first direction: stacking direction); a step (S20) of performing provisional alignment in an X axis direction (second direction: width direction) orthogonal to the Y axis direction after stacking the plurality of battery cells 100; a first over-compression step (S30: first pressure application step) of compressing the plurality of battery cells 100 along the Y axis direction to an over-compression region; a step (S40) of aligning the plurality of battery cells 100 in the X axis direction after relieving pressing force of the first over-compression step; a second over-compression step (S50: second pressure application step) of compressing the plurality of battery cells 100 along the Y axis direction to the over-compression region after aligning the plurality of battery cells 100 in the X axis direction; a step (S60) of disposing restraint member 300 on both sides in the Y axis direction with respect to the plurality of battery cells 100 under application of pressing force of the second over-compression step; and a step (S70) of restraining the plurality of battery cells 100 by restraint member 300 along the Y axis direction by relieving the pressing force of the second over-compression step after disposing restraint member 300.

The step (S20) of performing the provisional alignment in the X axis direction includes: a provisional compression step (S21); a width-direction provisional regulation step (S22); and an upper-surface provisional pressing step (S23). The step (S40) of aligning the plurality of battery cells 100 in the X axis direction includes: an upper-surface provisional pressing relieving step (S41); a (first) over-compression relieving step (S42); a width-direction regulation step (S43); and a width-direction regulation relieving step (S44).

Figure 5:
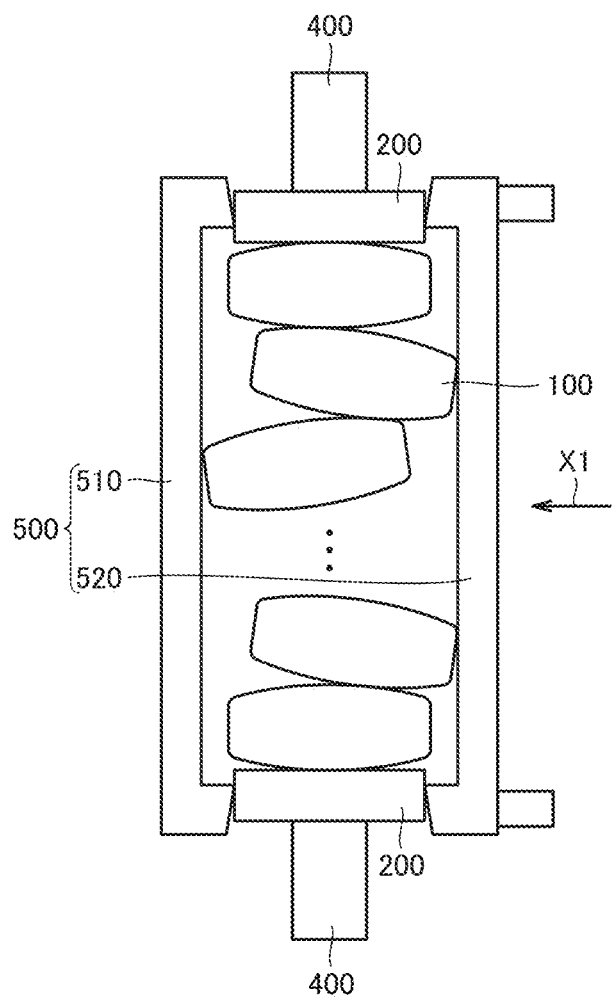
FIG. 5 is a diagram showing a provisional compression step (S21) and a width-direction provisional regulation step (S22).

FIG. 5 is a diagram showing the provisional compression step (S21) in the Y axis direction (stacking direction) and the provisional regulation step (S22) in the X axis direction (width direction). As shown in FIG. 5, a jig 400 is used to apply compression force to the stack of battery cells 100 and end plates 200. On this occasion, housing 120 of each battery cell 100 is slightly expanded by internal gas pressure.

Further, a jig 500 is used to perform provisional alignment of the plurality of battery cells 100 along the X axis direction. Jig 500 includes a first member 510 and a second member 520. By moving second member 520 toward first member 510 in a direction of arrow X1, the provisional alignment of the plurality of battery cells 100 in the X axis direction is performed. Even though battery cells 100 are sandwiched between first member 510 and second member 520, the plurality of battery cells 100 is not completely aligned in the X axis direction because each of battery cells 100 is in the expanded state.

Figure 6:
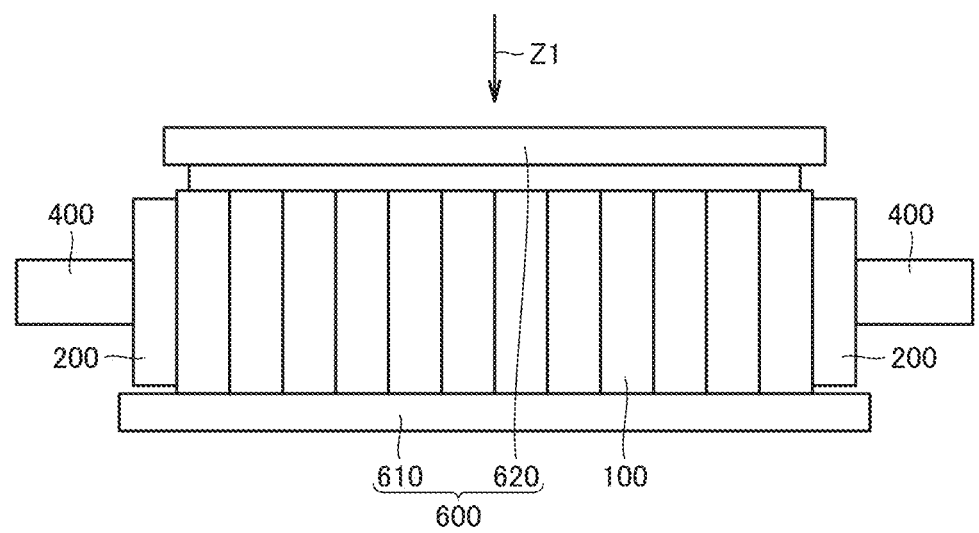
FIG. 6 is a diagram showing an upper-surface provisional pressing step (S23).

FIG. 6 is a diagram showing the upper-surface provisional pressing step (S23) after the provisional regulation in the X axis direction. As shown in FIG. 6, the stack of battery cells 100 and end plates 200 is sandwiched by a jig 600 in a Z axis direction. Jig 600 includes a first member 610 and a second member 620. By moving second member 620 toward first member 610 in a direction of arrow Z1, the provisional pressing of the upper surfaces of the plurality of battery cells 100 is performed.

Figure 7:
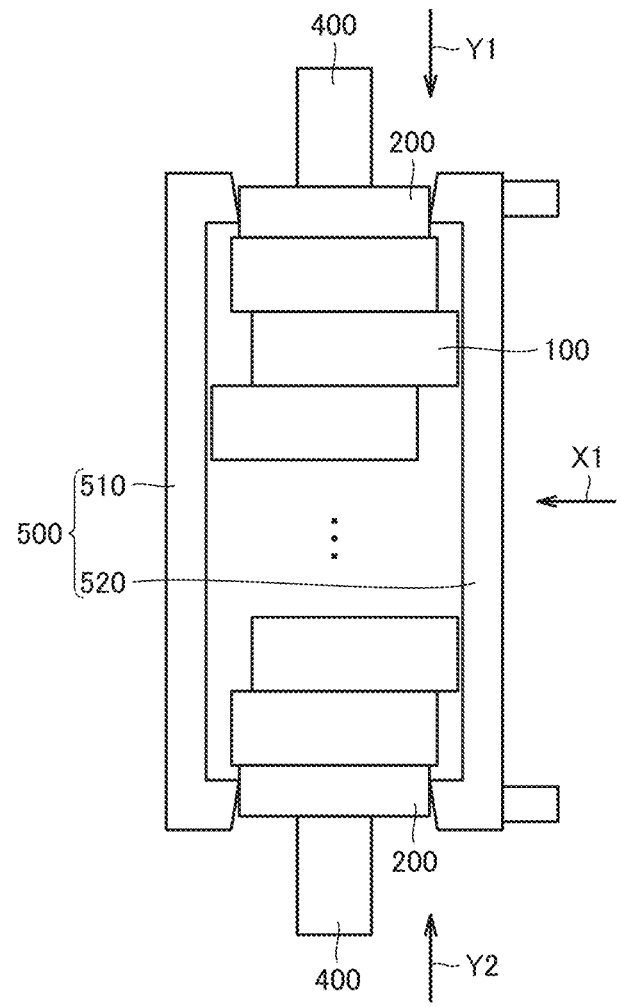
FIG. 7 is a diagram showing a (first) over-compression step (S30).

FIG. 7 is a diagram showing the (first) over-compression step (S30). As shown in FIG. 7, compression forces (arrows Y1, Y2) in the Y axis direction are applied by jig 400, thereby compressing each battery cell 100 into a substantially rectangular parallelepiped shape. On this occasion, the upper surfaces of the plurality of battery cells 100 are provisionally pressed.

Here, the term "over-compression" refers to a state in which the electrode assembly accommodated in housing 120 is compressed and deformed. When the compression is relieved from this state, the electrode assembly returns to its original shape. However, since the electrode assembly temporarily maintains the compressed shape, the electrode assembly gradually returns to its original shape over time.

Figure 8:
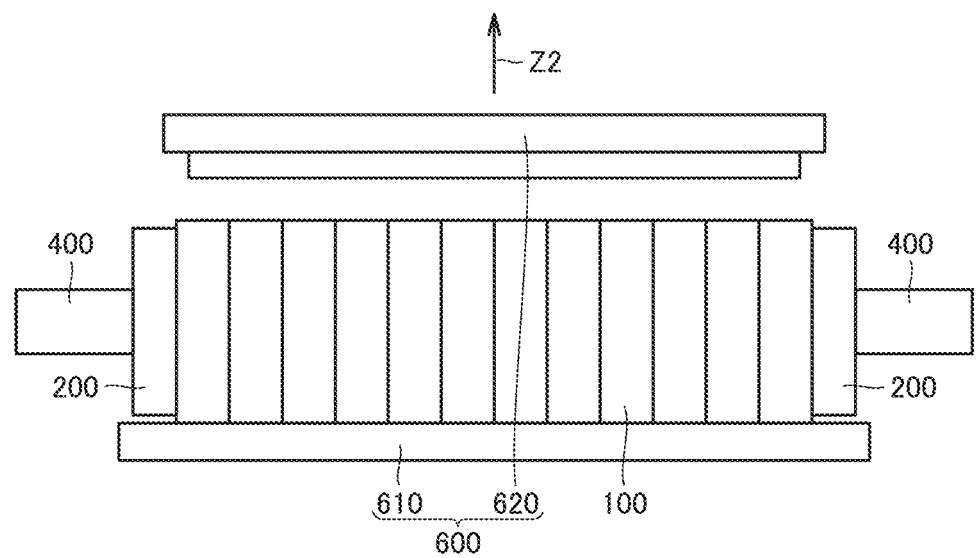
FIG. 8 is a diagram showing an upper-surface provisional pressing relieving step (S41).
Figure 9:
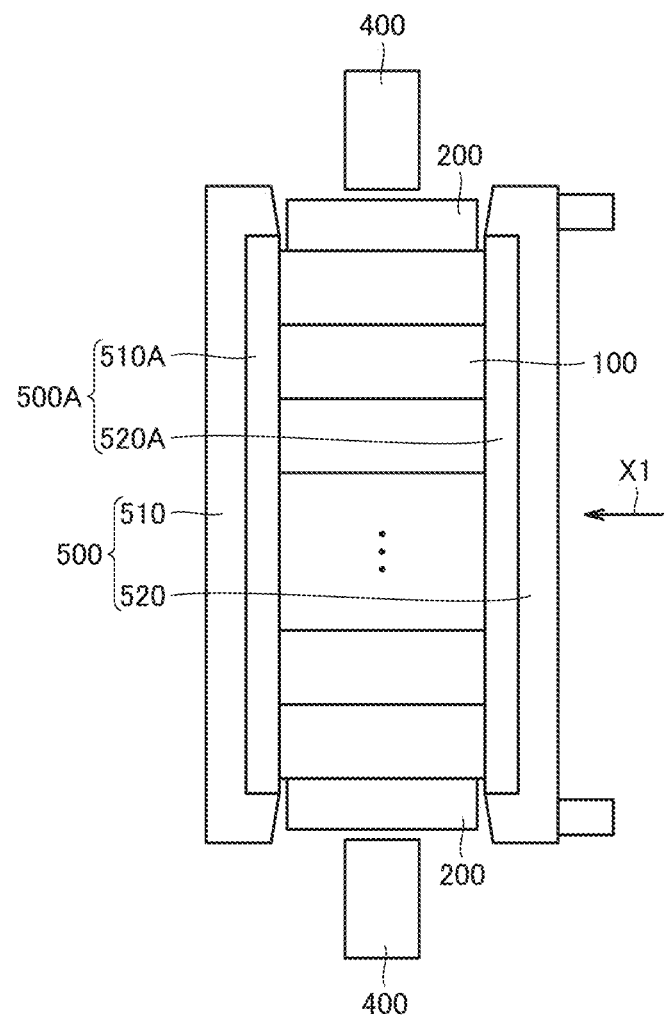
FIG. 9 is a diagram showing a (first) over-compression relieving step (S42) and a width-direction regulation step (S43).

Next, the step (S40) of aligning the plurality of battery cells 100 will be described with reference to FIGS. 8 to 10. FIG. 8 is a diagram showing the upper-surface provisional pressing relieving step (S41), FIG. 9 is a diagram showing the (first) over-compression relieving step (S42) and the width-direction regulation step (S43), and FIG. 10 is a diagram showing the width-direction regulation relieving step (S44).

As shown in FIG. 8, second member 620 of jig 600 is moved in a direction of arrow Z2 so as to be separated from battery cells 100 (S41). Then, as shown in FIG. 9, the compression force by jig 400 is relieved (S42). On this occasion, before housing 120 of each battery cell 100 returns to its original shape (slightly expanded state), first member 510 of jig 500 is moved in the direction of arrow X1 to align the plurality of battery cells 100 in the X axis direction (S43). Since housing 120 maintains the rectangular parallelepiped shape, precise alignment can be performed. Here, pressing members 510A, 520A are respectively installed on the surfaces of first member 510 and second member 520 of jig 500.

Figure 10:
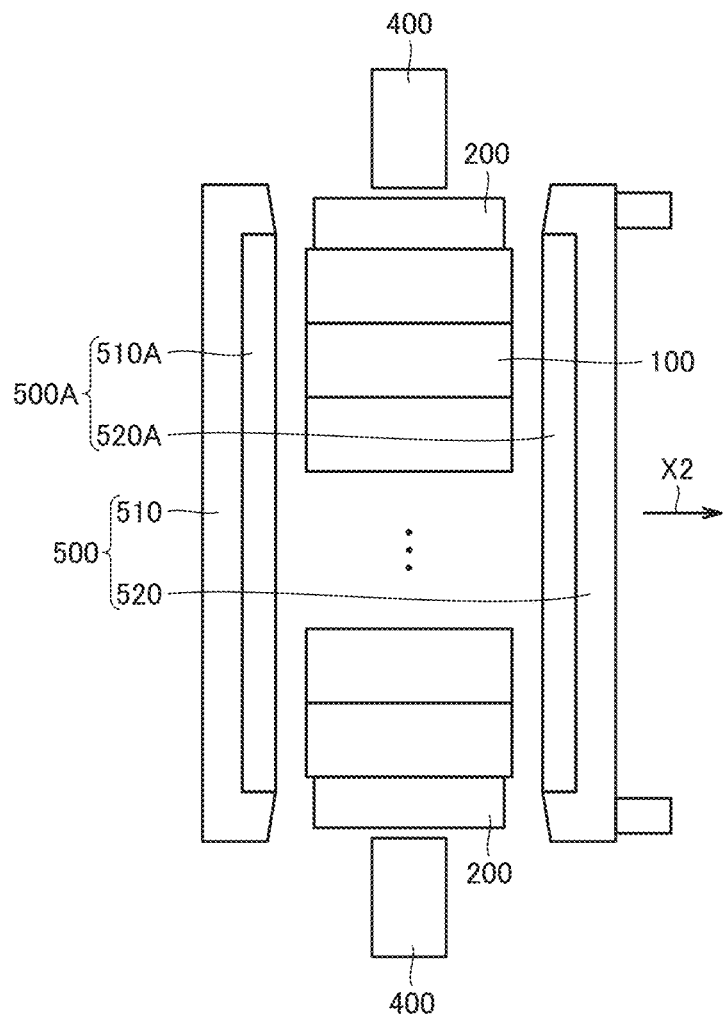
FIG. 10 is a diagram showing a width-direction regulation relieving step (S44).

After the plurality of battery cells 100 are aligned in the X axis direction, the second member of jig 500 is moved in a direction of arrow X2 to relieve the regulation force in the width direction (X axis direction) (S44) as shown in FIG. 10.

Figure 11:
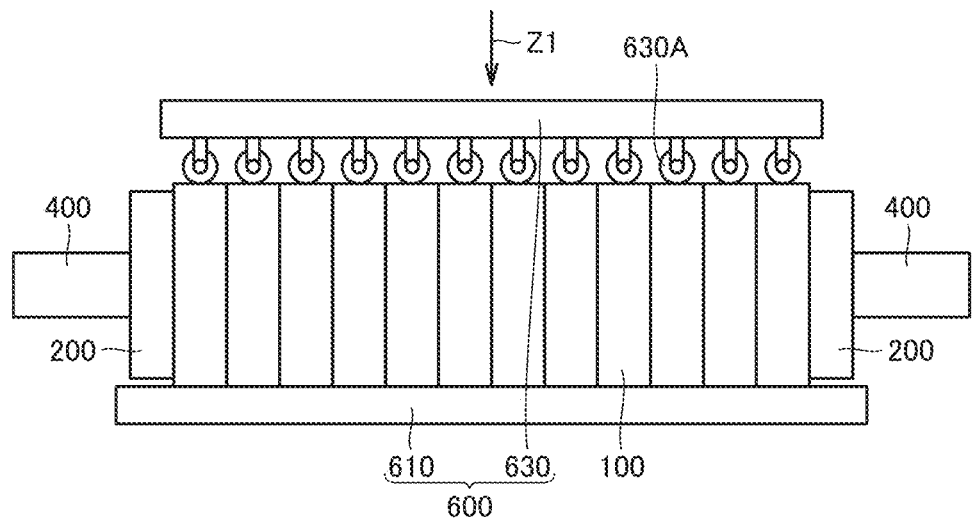
FIG. 11 is a diagram showing a (second) over-compression step (S50).
Figure 12:
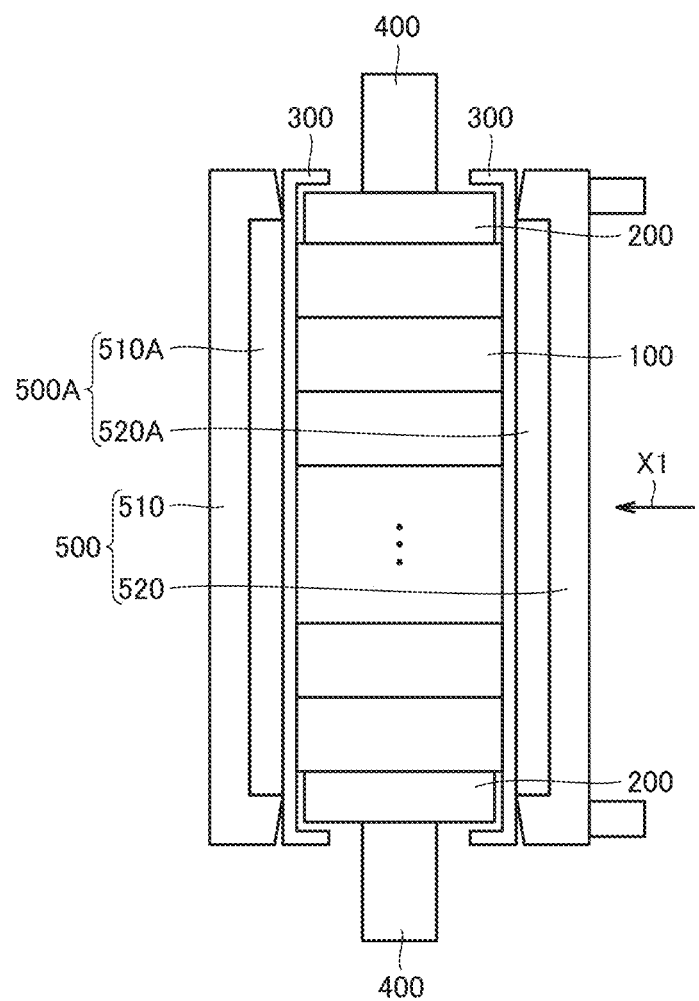
FIG. 12 is a diagram showing a restraint portion disposing step (S60).
Figure 13:
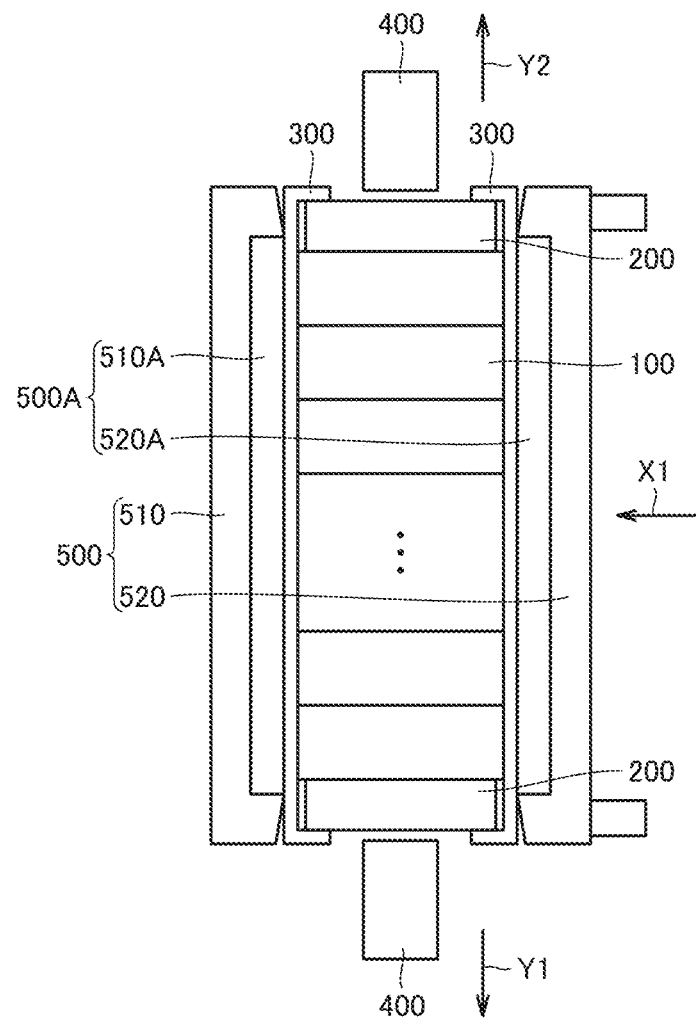
FIG. 13 is a diagram showing a (second) over-compression relieving step (S70).

FIG. 11 is a diagram showing the (second) over-compression step (S50). FIG. 12 is a diagram showing the step (S60) of disposing restraint member 300. FIG. 13 is a diagram showing the (second) over-compression relieving step (S70).

As shown in FIG. 11, the second over-compression step is performed with the upper surfaces of battery cells 100 being pressed by a third member 630 having rollers 630A. As shown in FIG. 12, restraint member 300 is disposed while maintaining the over-compression state. From this state, as shown in FIG. 13, jig 400 is moved in the directions of arrows Y1, Y2 or in one of the directions of arrows Y1, Y2 to relieve the over-compression state, with the result that the axial length of the stack of battery cells 100 and end plates 200A is increased and the stack is restrained in the stacking direction by restraint member 300.

Figure 14:
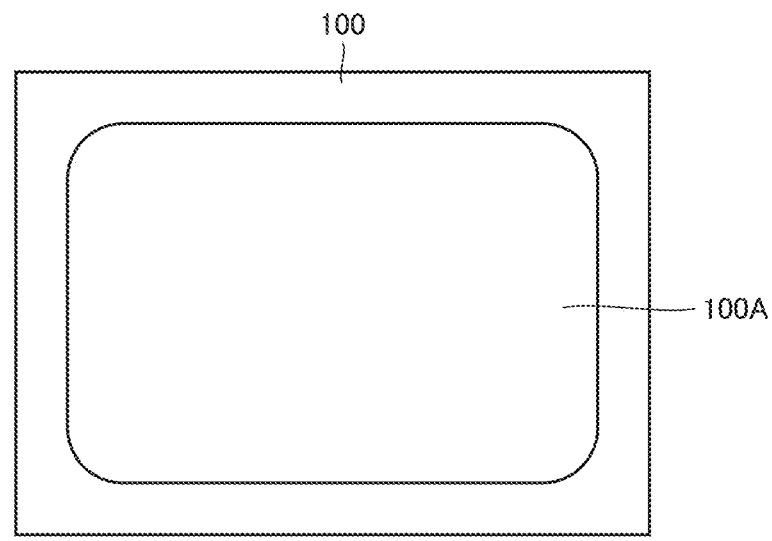
FIG. 14 is a diagram illustrating an indentation left in a battery cell having been through the steps of FIG. 4.

FIG. 14 is a diagram illustrating an indentation left in battery cell 100. According to the method of manufacturing battery pack 1 according to the present embodiment, the two over-compression steps are performed, so that a recess 100A corresponding to the shape of the separator disposed between the plurality of battery cells 100 is formed in the surface of each battery cell 100 in the stacking direction.

Next, as a modification of the "restraint portion", the following describes a structure in which a case 700 provides direct support instead of restraint member 300.

Figure 15:
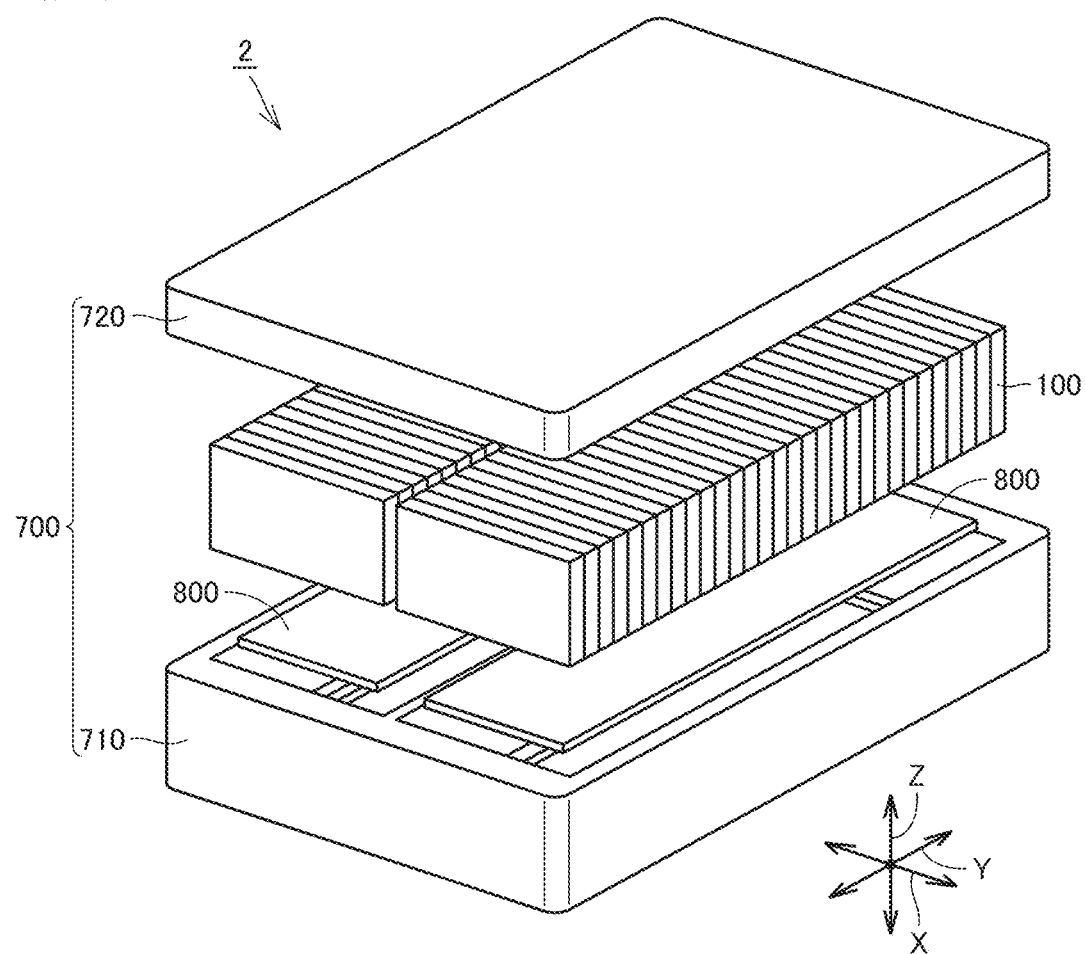
FIG. 15 is an exploded perspective view showing a configuration of the battery pack.

FIG. 15 is an exploded perspective view showing a configuration of a battery pack 2. Battery pack 2 includes battery cells 100, case 700 (sealed case), and heat conduction members 800.

The plurality of battery cells 100 (power storage cells) are stacked along the Y axis direction (stacking direction). Case 700 includes a case main body 710 and a cover member 720. Case main body 710 forms the bottom surface and side surfaces of case 700. Cover member 720 forms the upper surface of case 700. Case main body 710 is provided with an opening on the upper side (the electrode terminal 110 side) of the plurality of battery cells 100. Cover member 720 is provided over the opening of case main body 710.

Case 700 has an inner space for storing the stack of battery cells 100. Case main body 710 and cover member 720 may be cast components (die cast materials) each composed of a metal material such as aluminum or magnesium, or may be press-molded components each composed of a carbon-containing material, for example. Case 700 is not limited to the above configuration, and may be any case as long as a predetermined characteristic is satisfied in terms of strength, heat radiation, or heat conductivity. For example, each of case main body 710 and cover member 720 may be composed of a resin.

A joining portion between case main body 710 and cover member 720 may be sealed using a sealing material such as a rubber, an adhesive agent, a hot-melt material, or the like, or case main body 710 and cover member 720 may be joined to each other by ultrasonic welding, laser welding, or the like. In this way, a sealed space is formed inside case 700 constituted of case main body 710 and cover member 720.

Heat conduction member 800 is provided between each battery cell 100 and case main body 710 of case 700, and promotes transfer of heat generated in battery cell 100 to case 700.

Battery pack 2 can be mounted on a vehicle. When battery pack 2 is mounted on a vehicle, cover member 720 is typically located on the upper side with respect to case main body 710. In the present specification, the Z axis direction may be referred to as "upward/downward direction", the case main body 710 side in the Z axis direction may be referred to as "lower side", and the cover member 720 side may be referred to as "upper side".

In battery pack 2, the stack of battery cells 100 is compressed and restrained in the Y axis direction (stacking direction) by case main body 710.

Figure 16:
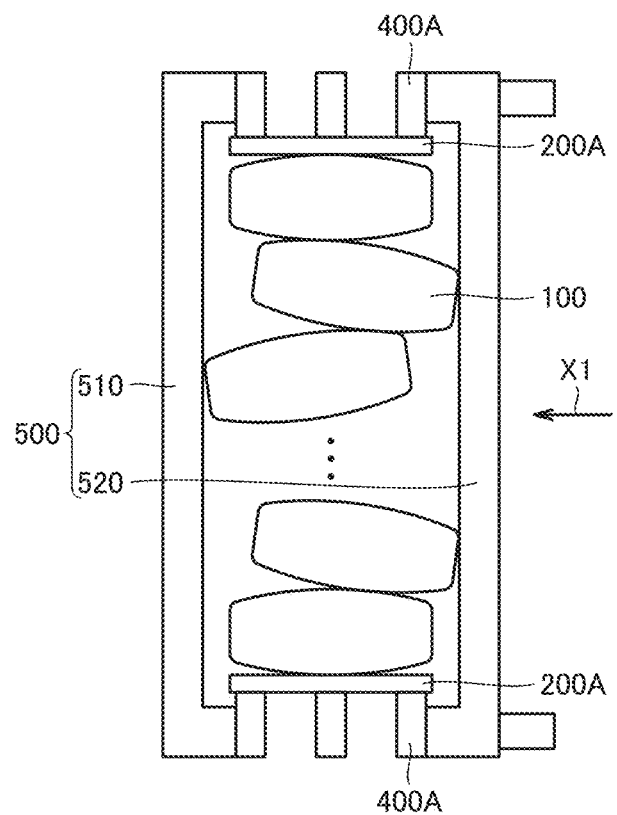
FIG. 16 is a diagram showing a provisional compression step (S21) and a width-direction provisional regulation step (S22).

FIG. 16 is a diagram showing the provisional compression step (S21) in the Y axis direction (stacking direction) and the provisional regulation step (S22) in the X axis direction (width direction). As shown in FIG. 16, a jig 400A is used to apply compression force to the stack of battery cells 100 and end plates 200A. On this occasion, housing 120 of each battery cell 100 is slightly expanded by internal gas pressure.

Further, jig 500 is used to perform provisional alignment of the plurality of battery cells 100 along the X axis direction. Jig 500 includes first member 510 and second member 520. By moving second member 520 toward first member 510 in the direction of arrow Xl, the provisional alignment of the plurality of battery cells 100 in the X axis direction is performed. Even though battery cells 100 are sandwiched between first member 510 and second member 520, the plurality of battery cells 100 are not completely aligned in the X axis direction because each of battery cells 100 is in the expanded state.

Figure 17:
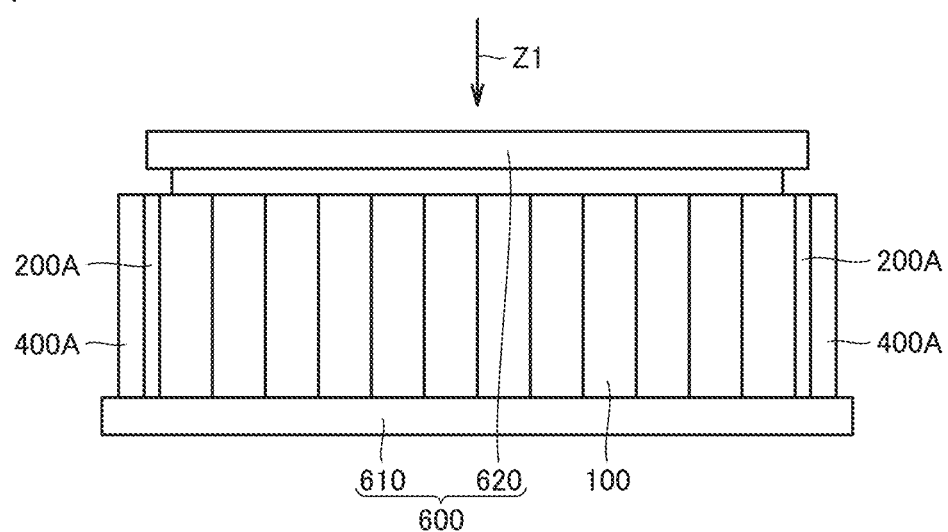
FIG. 17 is a diagram showing an upper-surface provisional pressing step (S23).

FIG. 17 is a diagram showing the upper-surface provisional pressing step (S23) after the provisional regulation in the X axis direction. As shown in FIG. 17, the stack of battery cells 100 and end plates 200A is sandwiched by jig 600 in the Z axis direction. Jig 600 includes first member 610 and second member 620. By moving second member 620 toward first member 610 in the direction of arrow Z1, the provisional pressing of the upper surfaces of the plurality of battery cells 100 is performed.

Figure 18:
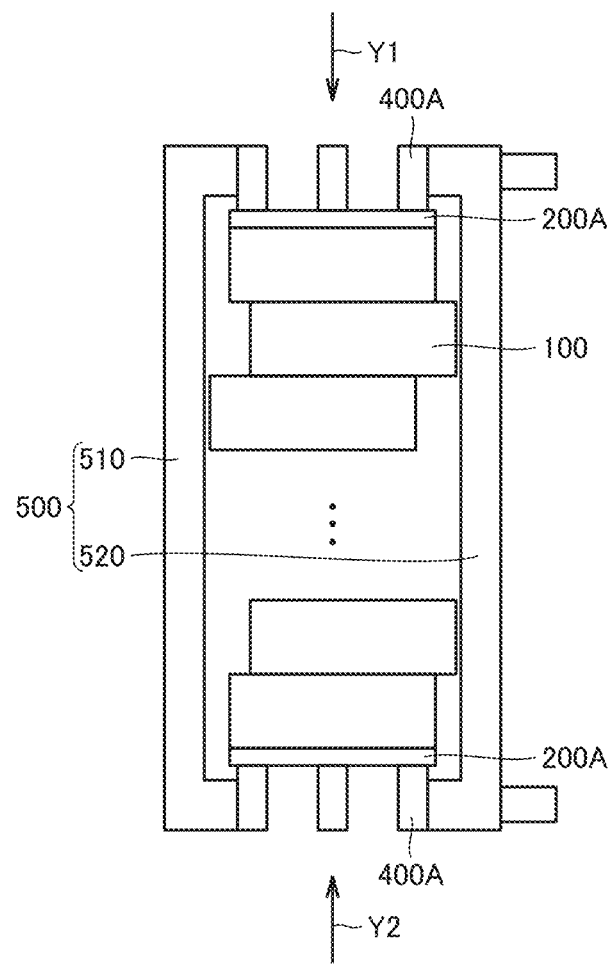
FIG. 18 is a diagram showing a (first) over-compression step (S30).

FIG. 18 is a diagram showing the (first) over-compression step (S30). As shown in FIG. 7, compression forces (arrows Y1, Y2) in the Y axis direction are applied by jig 400A, thereby compressing each battery cell 100 into a substantially rectangular parallelepiped shape. On this occasion, the upper surfaces of the plurality of battery cells 100 are provisionally pressed.

Next, the step (S40) of aligning the plurality of battery cells 100 will be described with reference to FIGS. 19 to 21.

Figure 19:
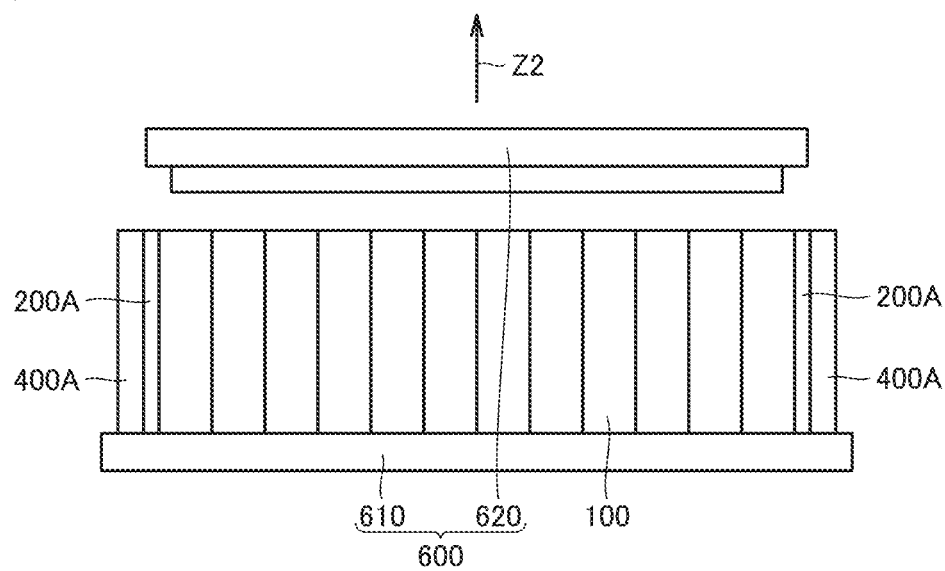
FIG. 19 is a diagram showing an upper-surface provisional pressing relieving step (S41).
Figure 20:
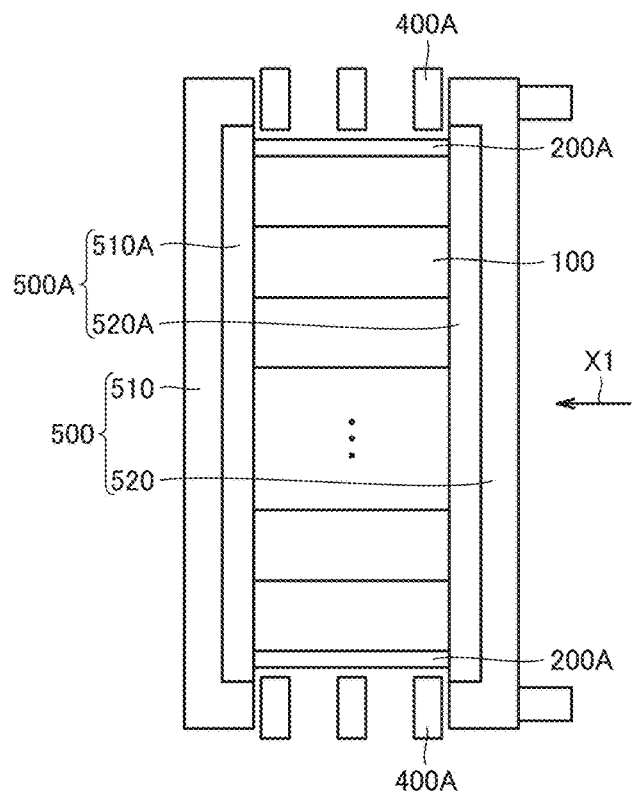
FIG. 20 is a diagram showing a (first) over-compression relieving step (S42) and a width-direction regulation step (S43).
Figure 21:
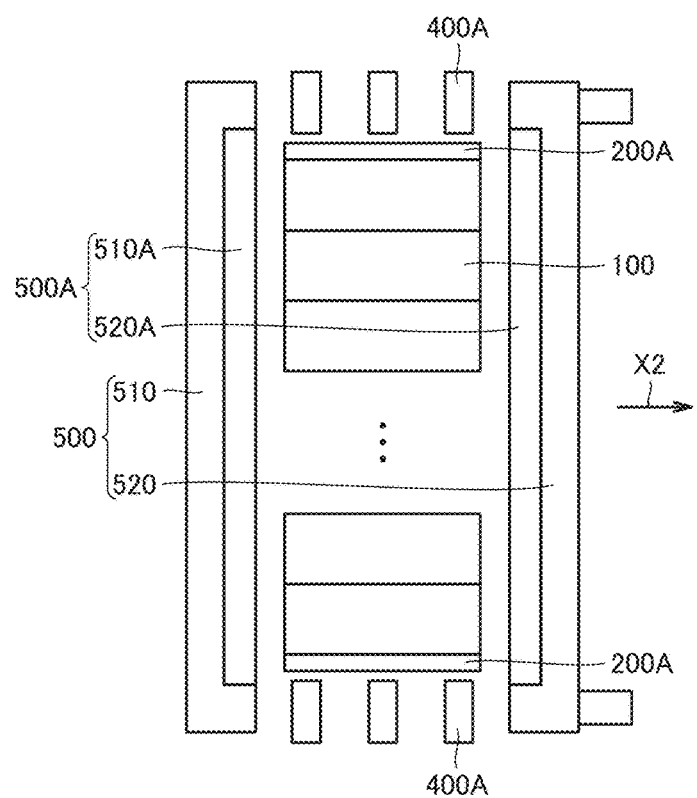
FIG. 21 is a diagram showing a width-direction regulation relieving step (S44).

FIG. 19 is a diagram showing the upper-surface provisional pressing relieving step (S41), FIG. 20 is a diagram showing the (first) over-compression relieving step (S42) and the width-direction regulation step (S43), and FIG. 21 is a diagram showing the width-direction regulation relieving step (S44).

As shown in FIG. 19, second member 620 of jig 600 is moved in the direction of arrow Z2 so as to be separated from battery cells 100 (S41). Then, as shown in FIG. 20, the compression force by jig 400A is relieved (S42). On this occasion, before housing 120 of each battery cell 100 returns to its original shape (slightly expanded state), first member 510 of jig 500 is moved in the direction of arrow X1 to align the plurality of battery cells 100 in the X axis direction (S43). Since housing 120 maintains the rectangular parallelepiped shape, precise alignment can be performed. Here, pressing members 510A, 520A are respectively installed on the surfaces of first member 510 and second member 520 of jig 500.

After the plurality of battery cells 100 are aligned in the X axis direction, the second member of jig 500 is moved in the direction of arrow X2 to relieve the regulation force in the width direction (X axis direction) (S44) as shown in FIG. 21.

Figure 22:
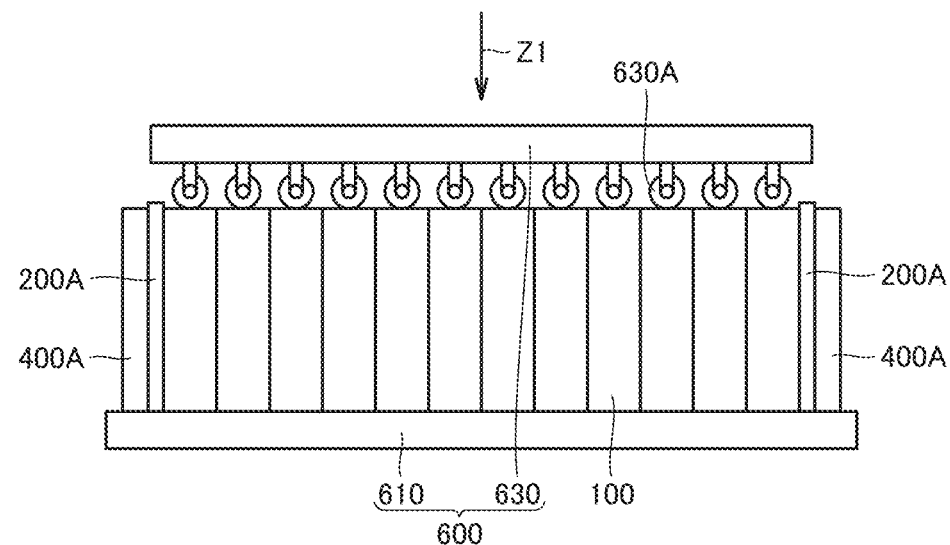
FIG. 22 is a diagram showing a (second) over-compression relieving step (S70).
Figure 23:
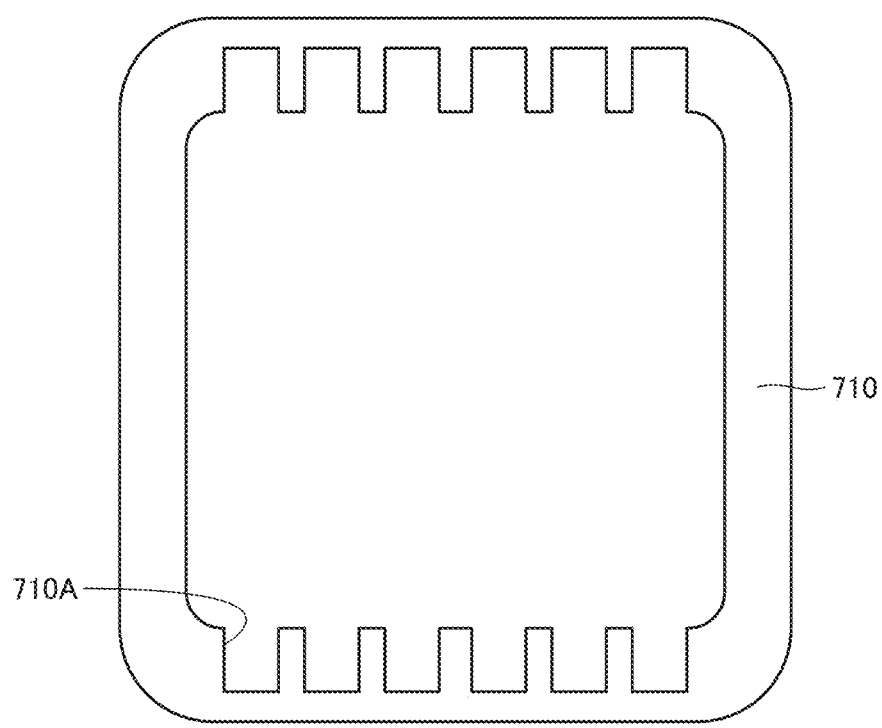
FIG. 23 is a diagram showing a case main body serving as the restraint portion.
Figure 24:
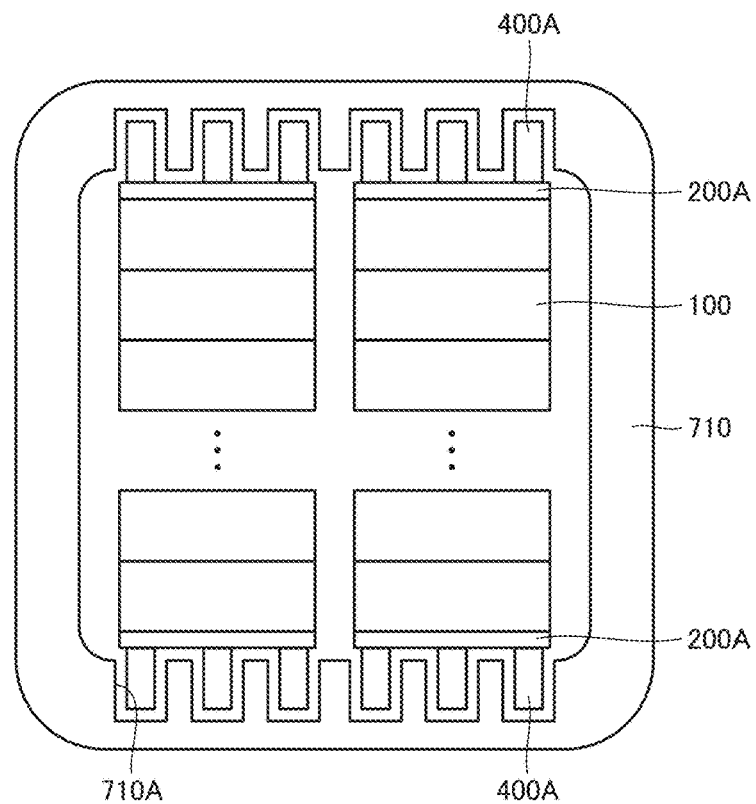
FIG. 24 is a diagram showing a restraint portion disposing step (S60).
Figure 25:
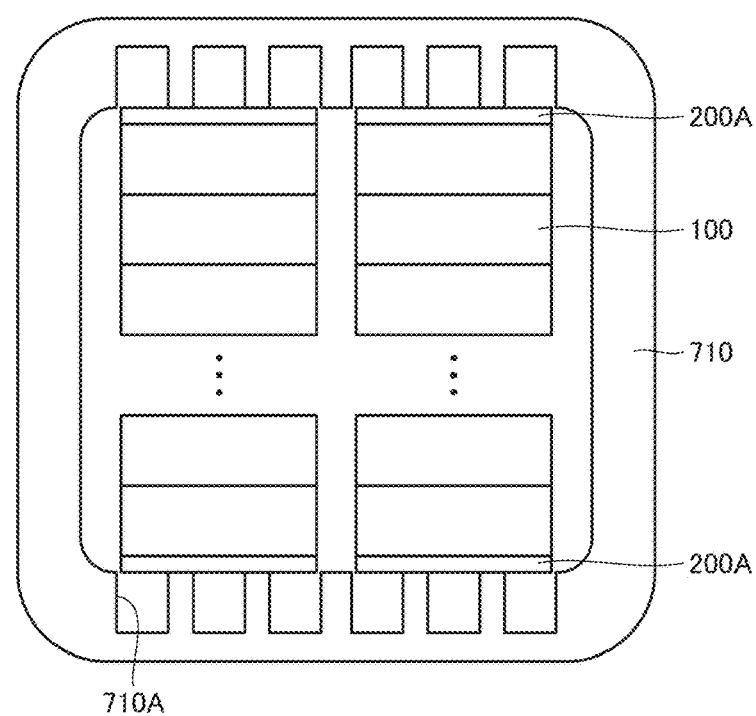
FIG. 25 is a diagram showing a (second) over-compression relieving step (S70).
Figure 26:
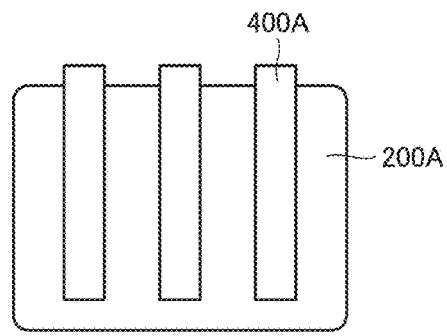
FIG. 26 is a diagram showing a jig for holding a battery cell.

FIG. 22 is a diagram showing the (second) over-compression step (S50). FIG. 23 is a diagram showing case main body 710 serving as the "restraint portion". FIG. 24 is a diagram showing the step (S60) of disposing case 700 serving as the restraint portion. FIG. 26 is a diagram showing the (second) over-compression relieving step (S70).

As shown in FIG. 22, the second over-compression step is performed with the upper surfaces of battery cells 100 being pressed by third member 630 having rollers 630A. As shown in FIG. 23, case main body 710 is provided with a recess 710A into which jig 400A can be inserted with the plurality of battery cells 100 being held. As shown in FIG. 24, jig 400A is inserted into recess 710A while maintaining the over-compression state. In this way, case main body 710 serving as the "restraint portion" is disposed beside the both end sides of the stack of battery cells 100 and end plates 200A. From this state, jig 400A is moved in the Z axis direction (direction perpendicular to the plane of the sheet of FIG. 24) to relieve the over-compression state, with the result that the axial length of the stack of battery cells 100 and end plates 200A is increased and the stack is restrained in the stacking direction by the wall surface of case main body 710.

Figure 27:
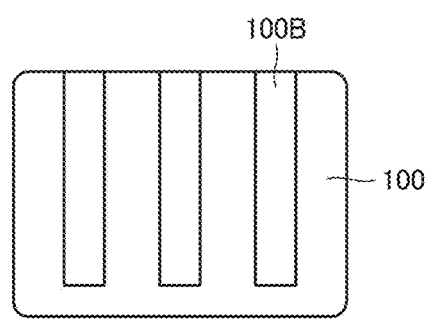
FIG. 27 is a diagram illustrating indentations left in a battery cell having been through the steps of FIG. 4.

Each of FIGS. 26 and 27 is a diagram illustrating indentations left in battery cell 100. As shown in FIG. 26, the stack of battery cells 100 is over-compressed twice by jig 400A with thin end plates 200A being interposed. Hence, recesses 100B corresponding to the shape of jig 400A are formed in the surface of battery cell 100 in the stacking direction.

Figure 28:
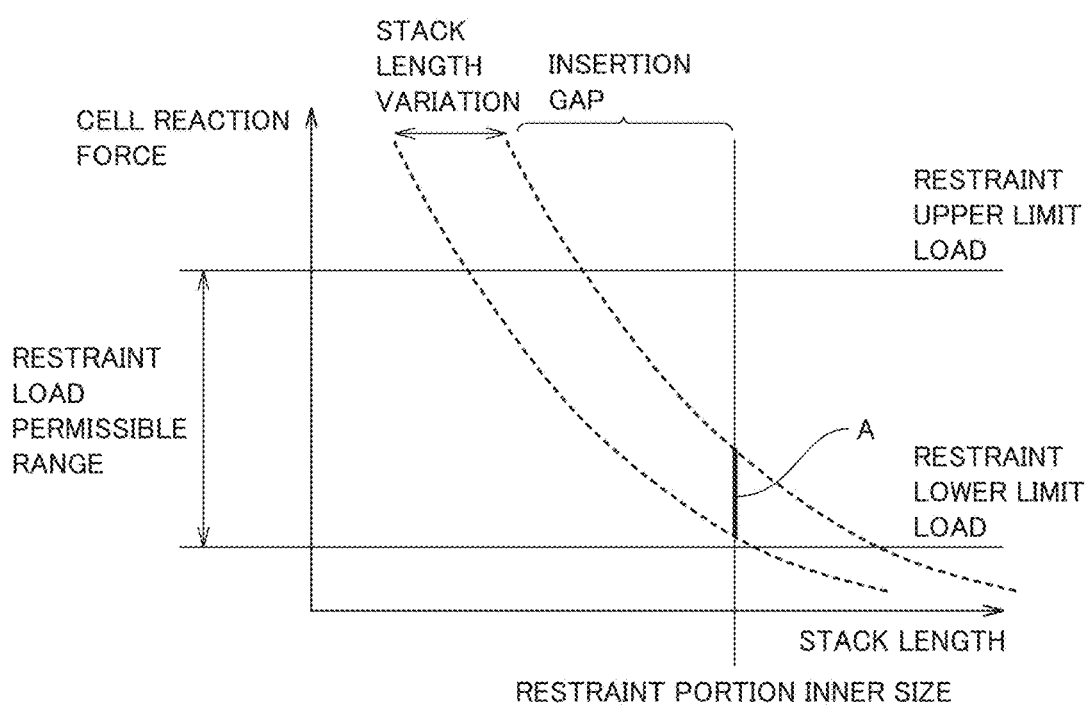
FIG. 28 is a conceptual diagram showing a characteristic of a spring constant of the battery cells.

FIG. 28 is a conceptual diagram showing a characteristic of a spring constant of battery cells 100. As shown in FIG. 28, battery cells 100 have such a characteristic that the inclination of cell reaction force-stack length ("spring constant" of battery cells 100) is increased as the stack length is smaller.

The length of the "restraint portion inner size" is set such that a portion ("A" in FIG. 28) located between two curves (two broken lines in FIG. 28) of the "spring constant" of battery cells 100 in consideration of the "stack length variation" falls within a "restraint load permissible range".

Figure 29:
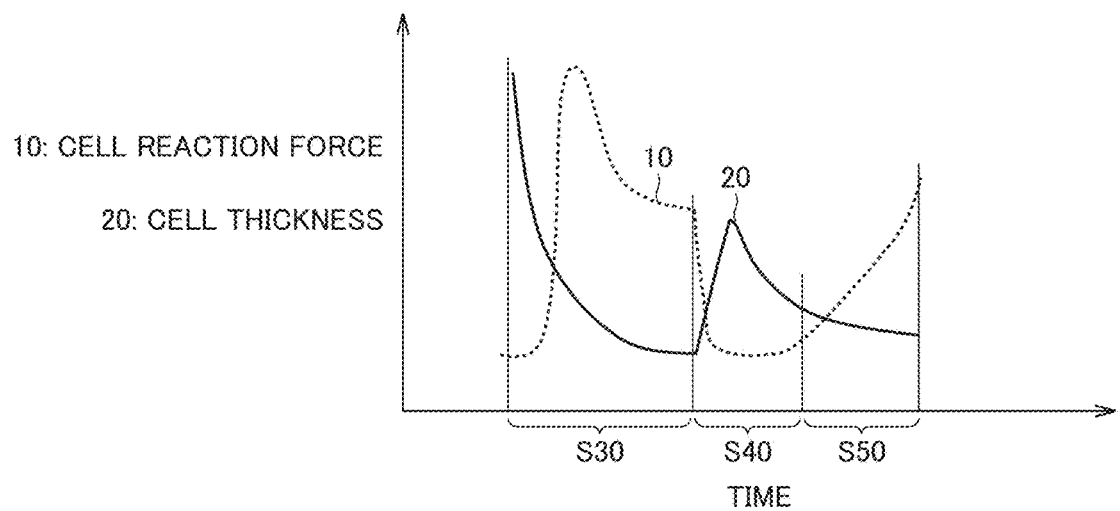
FIG. 29 is a diagram showing an exemplary relation between passage of time and each of cell reaction force and cell thickness.

FIG. 29 is a diagram showing an exemplary relation between passage of time and each of the cell reaction force and the cell thickness. As shown in FIG. 29, in the first over-compression step (S30), cell thickness 20 is reduced as cell reaction force 10 is increased. Thereafter, when the over-compression is relieved (S42) in the step (S40) of aligning the plurality of battery cells 100, cell thickness 20 is increased for a certain period of time. During this period, the plurality of battery cells 100 can be aligned in the X axis direction (S43). Thereafter, cell thickness 20 is reduced as cell reaction force 10 is increased in the second over-compression step (S50). Thus, restraint member 300 or case main body 710 can be disposed.

According to the method of manufacturing battery pack 1 according to the present embodiment, after the first over-compression step (S30), battery cells 100 are aligned in the X axis direction with the compression force being relieved, thereby precisely performing alignment in the X axis direction. Further, since the first and second over-compression steps (S30, S50) are performed with the upper surfaces of battery cells 100 being pressed, alignment in the Z axis direction is also performed precisely. Therefore, battery pack 1 can be obtained in which the plurality of battery cells 100 are precisely aligned in not only the Y axis direction but also the X axis direction and the Z axis direction. Since the plurality of battery cells 100 are precisely aligned in the three axis directions, the bus bars can be stably and securely joined between the plurality of battery cells 100.

It should be noted that in each of the first and second over-compression steps (S30, S50), the over-compression state in which the electrode assembly is deformed does not need to be necessarily reached, and a state close to the over-compression may be included in the scope of the present technology as long as a period of time during which the cell thickness is reduced can be secured only while aligning battery cells 100 in the X axis direction.

Although the embodiments of the present invention have been described and illustrated in detail, it is clearly understood that the same is by way of illustration and example only and is not to be taken by way of limitation, the scope of the present invention being interpreted by the terms of the appended claims.

What is claimed is:
1. A method of manufacturing a power storage module, the method comprising:
   stacking a plurality of power storage cells along a first direction;
   compressing the plurality of power storage cells along the first direction;
   aligning the plurality of power storage cells in a second direction orthogonal to the first direction after relieving pressing force of the compressing of the plurality of power storage cells along the first direction;
   compressing the plurality of power storage cells along the first direction after aligning the plurality of power storage cells in the second direction;
   disposing a restraint portion on both sides in the first direction with respect to the plurality of power storage cells under application of pressing force of the compressing of the plurality of power storage cells along the first direction after aligning the plurality of power storage cells in the second direction; and
   restraining the plurality of power storage cells by the restraint portion along the first direction by relieving, after disposing the restraint portion, the pressing force of the compressing of the plurality of power storage cells along the first direction after aligning the plurality of power storage cells in the second direction.

2. The method of manufacturing the power storage module according to claim 1, wherein each of the plurality of power storage cells is formed to have a flat rectangular parallelepiped shape.

3. The method of manufacturing the power storage module according to claim 1, wherein in the compressing of the plurality of power storage cells along the first direction before aligning the plurality of power storage cells in the second direction, the plurality of power storage cells are compressed to an over-compression region.

4. The method of manufacturing the power storage module according to claim 1, wherein in the compressing of the plurality of power storage cells along the first direction after aligning the plurality of power storage cells in the second direction, the plurality of power storage cells are compressed to an over-compression region.

5. The method of manufacturing the power storage module according to claim 1, wherein
  each of the plurality of power storage cells includes a positive electrode terminal and a negative electrode terminal, and
  the second direction is a direction in which the positive electrode terminal and the negative electrode terminal are arranged side by side.

6. The method of manufacturing the power storage module according to claim 1, further comprising performing provisional alignment in the second direction after stacking the plurality of power storage cells and before performing the compressing of the plurality of power storage cells along the first direction before aligning the plurality of power storage cells in the second direction.

\* \* \* \* \*